Patented Oct. 16, 1934

1,976,831

UNITED STATES PATENT OFFICE 1,976,831

CHEMICAL COMPOUND AND METHOD OF PRODUCING THE SAME

Charles Everett Breizy, Pittsfield, Mass.

No Drawing. Application May 1, 1934, Serial No. 723,355

8 Claims. (Cl. 99—1)

My invention more particularly relates to a method of producing a substantially homogeneous mixture of salts which is especially useful in the treatment of meats. It has been common to use for this purpose a mixture of a nitrite, either potassium or sodium, and a nitrate, either potassium or sodium mixed with ordinary salt. It is known that the nitrite penetrates the meat much more quickly than does the nitrate. The nitrite also immediately imparts to the meat a red color but with a pinkish cast. The nitrite when used alone, however, decomposes the albumen of the meat after a period of four or five days thereby causing the binding or "shortening" quality of the meat to be destroyed. The nitrate penetrates the meat much more slowly than does the nitrite and produces a dark color therein which, after about four or five days, changes to a dark red color. Moreover the nitrate has an objectionably bitter taste.

Both the nitrite and the nitrate occur in the form of crystals and when a mechanical mixture thereof is made in the usual manner the respective salts exhibit their individual characteristics above described when used in the treatment of meat.

My present invention is based on the discovery that a homogeneous mixture may be obtained by mixing together sodium nitrate and sodium nitrite and heating the mixture, while being stirred, to the melting temperature, and then suddenly cooling the mixture. I find that while the proportion of the nitrite put into the mixture remains constant within the limit of experimental error that the properties of the material thus produced exhibited in the treatment of meats are quite different from those of the individual constituents which make up the mixture.

The method embodying my invention may be carried out either by forming a mechanical mixture of the ingredients, melting and then suddenly cooling, or a solution of the constituents may first be formed, permitted to stand for at least five days and preferably from five to six days, the liquid evaporated and the residue melted and suddenly cooled.

The first method may be carried out by mixing together 1½ parts by weight of sodium nitrite and 1 part of sodium nitrate in a suitable vessel which may be made of aluminum, and the mixture melted while being stirred. In order to secure data regarding the properties of the compound made in accordance with my invention the following experiments were made. A mixture of 300 grams of sodium nitrite of 99.7% purity and 200 grams of sodium nitrate of C. P. grade were placed in an aluminum vessel and heated with stirring to the melting point. The mixture melted at 225–230° C. (437–446° F). As soon as the mixture was melted, a small amount, approximately 10–15 grams of the melted mixture, was removed and cast immediately onto a cold steel plate. It solidified at once, was removed and placed in a tightly stoppered bottle. The heating of the mixture was continued until the thermometer immersed in the melted mixture gave a reading of 245° C. or 15° above the melting point. The mixture was held at 245° C. for ten minutes, a small sample removed and cast on a cold steel plate, solidified and then placed in a stoppered bottle. The foregoing operation was repeated at intervals of 15° C., the final casting being made after the material had been held ten minutes at a temperature of 350° C. The following table gives the detailed results of the experiments.

| Sample # | Temperature when cast | Percent sodium nitrite |
|---|---|---|
| #1 | 230 degrees C. (M.P.) | 59.9 |
| #2 | 245 degrees C. | 59.8 |
| #3 | 260 degrees C. | 59.9 |
| #4 | 275 degrees C. | 60.0 |
| #5 | 290 degrees C. | 59.9 |
| #6 | 305 degrees C. | 59.8 |
| #7 | 320 degrees C. | 59.9 |
| #8 | 335 degrees C. | 59.9 |
| #9 | 350 degrees C. | 60.0 |

The melting point of sodium nitrite is given in the literature as 271° C. and that of sodium nitrate as 317° C. It will be noted that the melting point of the mixture is very substantially lower than the melting point of either constituent. It is further stated in the literature that sodium nitrite decomposes a 320° C. and sodium nitrate at 380° C. Since the sodium nitrite content of the melted mixture at various temperatures remains substantially constant within the limit of experimental error and since this nitrite content is equal to the percentage used, it follows that the sodium nitrite in the mixture has not decomposed at any temperature up to and including 350° C. which latter temperature it thirty degrees higher than its decomposition point when heated alone. The fact that the melting temperature of the mixture is substantially lower than that of either of the constituents is of a decided advantage since it will be noted that the melting point of sodium nitrate is very near the decomposition point of sodium nitrite when these materials are heated separately.

In practice after the mixture has been melted it is poured in a thin layer upon a plate or upon rotating rolls which are artificially cooled and which solidifies the mixture immediately thereby substantially preventing the formation of crystals, and when cast in this manner no crystals are visible even under moderate magnification. The cast material may be granulated or pulverized in a pulverizing mill and is then ready for the treatment of meat.

I find that sodium chloride which is particularly valuable as a curative agent for meat may also advantageously be added to the mixture. When sodium chloride is to be added, the temperature of the mixture of the nitrite and the nitrate while being stirred is raised to about 270° C. and sodium chloride in the proportion of ½ part by weight to the 2½ parts by weight of the combined sodium nitrite and sodium nitrate is sprinkled on the surface of the melted mixture. While the melting point of sodium chloride is about 800° C., I find that it goes into solution and the nitrite and nitrate compound together with the chloride form a homogeneous mass.

The method of preparing the salts may also and preferably is carried out by first making a solution of the sodium nitrite and sodium nitrate preferably in the proportions of 1½ pounds of nitrite, 1 pound of nitrate and a gallon of water, and then permitting the solution to stand and age for at least five days and preferably from five to six days, though it will be understood that the solution may stand for a longer period without injury. The solution is then evaporated in a suitable vessel and the residue melted in the manner described above and sodium chloride may be added if desired in the described manner.

It will be understood that it is not necessary to add the ½ part of sodium chloride to the mixture of the nitrite and the nitrate though I find it desirable to do so in order to add weight to and dilute the mixture.

By dissolving the nitrite and the nitrate and permitting it to stand and age for a period of five to six days and then evaporating and melting the residue, the two constituents forming the compound, when used in the treatment of meat, act differently than do the nitrite and nitrate when used separately. The nitrate colors the meat at once and has lost its bitter taste. At the same time the properties of the nitrite, so far as they affect the meat are concerned, have undergone a change. I believe that the nitrite is partially oxidized to nitrate. But whatever the nature of the change may be, I find that it does not penetrate the meat so fast as nitrite alone and after the melting process there is no longer any burning effect on the meat. The slower penetration of the material is an advantage as it carries the sodium chloride which is mixed therewith prior to the treatment of the meat along with it thereby causing all the materials used in the treatment of the meat to penetrate evenly and thus securing a more even and satisfactory curing thereof. It will be understood that the sodium chloride preserves the meat while the nitrite and nitrate mixture serves to color the same properly.

When meat is treated with a mixture of nitrite and sodium chloride in the ordinary manner, the nitrite penetrates the meat too fast leaving the salt, which penetrates more slowly, behind. The nitrite colors the meat, but as preserving depends upon the sodium chloride and the nitrite penetrates the meat faster than the chloride, the meat is not properly cured.

It will be seen, therefore, that the treatment to which the materials are subjected in accordance with my invention reduces the rate of penetration of the nitrite thereby causing the nitrite and the sodium chloride which is later added to penetrate evenly. At the same time the aging process to which the solution is subjected increases its penetrating and coloring properties in treating meat and to act much as the nitrite, and when the compound is formed in accordance with my invention becomes a homogeneous compound acting more slowly than nitrite alone and faster than nitrate alone in the treatment of meat both of which are advantageous.

While I have described the use of sodium nitrite and sodium nitrate as suitable for my purpose, it is to be understood that potassium nitrite and potassium nitrate may be used. It will also be understood that while I have described the proportions of materials that are desirable, those proportions may be varied somewhat and still secure the benefits of my invention.

The time required for curing meat by the compound made in accordance with my invention is substantially reduced. I have, for example, cured a six pound fresh shoulder with the compound formed in accordance with my invention in ten days whereas by the old method twenty-one days would be required for the curing process.

As an illustration of one use of my invention, ¼ ounce of the powdered compound made in accordance with my invention is thoroughly mixed with 3 pounds of sodium chloride and 100 pounds of beef is treated therewith in the usual manner.

While I have described my invention in its preferred embodiments, it is to be understood that the words which I have used are words of description and not of limitation. Hence, changes within the purview of the appended claims may be made without departing from the true scope and spirit of my invention in its broader aspects.

What I claim is:

1. The method of preparing a compound particularly intended for the treatment of meat which comprises forming a mixture of a nitrite and a nitrate selected from the group consisting of sodium and potassium, melting the mixture and then suddenly cooling the mixture without substantial crystallization.

2. The method of preparing a compound particularly intended for the treatment of meat which comprises forming a mixture of sodium nitrite and sodium nitrate, melting the mixture while stirring and then suddenly cooling the mixture by pouring it upon a cold surface.

3. The method of preparing a compound particularly intended for the treatment of meat which comprises forming a mixture of substantially 1½ parts by weight of sodium nitrite and 1 part of sodium nitrate, melting the mixture while stirring, suddenly cooling the mixture by pouring the same on a surface sufficiently cold to solidify the mixture without substantial crystallization and then pulverizing the compound.

4. The method of preparing a compound particularly intended for the treatment of meat which comprises forming a mixture of substantially 1½ parts by weight of sodium nitrite and 1 part of sodium nitrate, melting the mixture while stirring and then pouring the mixture on a surface sufficiently cold to prevent substantial crystallization.

5. The method of preparing a compound particularly intended for the treatment of meat which comprises forming a mixture of substantially 1½ parts by weight of sodium nitrite and 1 part of sodium nitrate, melting the mixture while stirring, sprinkling over the surface of the mixture sodium chloride, maintaining the temperature above the melting point until the sodium chloride is completely in solution and then suddenly cooling the mixture by pouring it upon a surface sufficiently cold to prevent substantial crystallization.

6. The method of preparing a compound particularly intended for the treatment of meat which comprises forming a mixture of substantially 1½ parts by weight of sodium nitrite and 1 part of sodium nitrate, melting the mixture while stirring, sprinkling over the surface of the mixture ½ part by weight of sodium chloride, maintaining the temperature above the melting point until the sodium chloride is completely in solution and then suddenly cooling the mixture by pouring it upon a surface sufficiently cold to prevent substantial crystallization.

7. The method of preparing a compound particularly applicable for the treatment of meat which comprises making a solution of sodium nitrite and sodium nitrate in the respective proportions of 1½ to 1 part by weight, evaporating the liquid, melting the residue and cooling the mixture with sufficient rapidity to prevent substantial crystallization.

8. The method of preparing a compound particularly applicable for the treatment of meat which comprises making a solution of sodium nitrite and sodium nitrate in the respective proportions of 1½ to 1 part by weight, permitting the solution to stand for at least five days, evaporating the liquid, melting the residue and cooling the mixture with sufficient rapidity to prevent substantial crystallization.

CHARLES EVERETT BREIZY.

DISCLAIMER 1,976,831.—*Charles Everett Breizy*, Pittsfield, Mass. CHEMICAL COMPOUND AND METHOD OF PRODUCING THE SAME. Patent dated October 16, 1934. Disclaimer filed August 20, 1936, by the patentee.

Hereby enters this disclaimer to claims 1, 2, 3, 4, 5, 6, 7, and 8 of the specification.
[*Official Gazette September 22, 1936.*]

a surface sufficiently cold to prevent substantial crystallization.

5. The method of preparing a compound particularly intended for the treatment of meat which comprises forming a mixture of substantially 1½ parts by weight of sodium nitrite and 1 part of sodium nitrate, melting the mixture while stirring, sprinkling over the surface of the mixture sodium chloride, maintaining the temperature above the melting point until the sodium chloride is completely in solution and then suddenly cooling the mixture by pouring it upon a surface sufficiently cold to prevent substantial crystallization.

6. The method of preparing a compound particularly intended for the treatment of meat which comprises forming a mixture of substantially 1½ parts by weight of sodium nitrite and 1 part of sodium nitrate, melting the mixture while stirring, sprinkling over the surface of the mixture ½ part by weight of sodium chloride, maintaining the temperature above the melting point until the sodium chloride is completely in solution and then suddenly cooling the mixture by pouring it upon a surface sufficiently cold to prevent substantial crystallization.

7. The method of preparing a compound particularly applicable for the treatment of meat which comprises making a solution of sodium nitrite and sodium nitrate in the respective proportions of 1½ to 1 part by weight, evaporating the liquid, melting the residue and cooling the mixture with sufficient rapidity to prevent substantial crystallization.

8. The method of preparing a compound particularly applicable for the treatment of meat which comprises making a solution of sodium nitrite and sodium nitrate in the respective proportions of 1½ to 1 part by weight, permitting the solution to stand for at least five days, evaporating the liquid, melting the residue and cooling the mixture with sufficient rapidity to prevent substantial crystallization.

CHARLES EVERETT BREIZY.

DISCLAIMER 1,976,831.—*Charles Everett Breizy*, Pittsfield, Mass. CHEMICAL COMPOUND AND METHOD OF PRODUCING THE SAME. Patent dated October 16, 1934. Disclaimer filed August 20, 1936, by the patentee.

Hereby enters this disclaimer to claims 1, 2, 3, 4, 5, 6, 7, and 8 of the specification.
[*Official Gazette September 22, 1936.*]